(12) United States Patent  
Soklaski (10) Patent No.: US 9,039,341 B2  
(45) Date of Patent: May 26, 2015

(54) SYSTEM AND APPARATUS FOR IMPROVED WHEELCHAIR LIFT

(71) Applicant: Tyrone Soklaski, West Palm Beach, FL (US)

(72) Inventor: Tyrone Soklaski, West Palm Beach, FL (US)

( * ) Notice: Subject to any disclaimer, the term of this patent is extended or adjusted under 35 U.S.C. 154(b) by 0 days.

(21) Appl. No.: 13/771,958

(22) Filed: Feb. 20, 2013

(65) Prior Publication Data

US 2014/0023470 A1    Jan. 23, 2014

Related U.S. Application Data

(60) Provisional application No. 61/674,011, filed on Jul. 20, 2012.

(51) Int. Cl.
*B60P 1/44* (2006.01)
*B60Q 9/00* (2006.01)

(52) U.S. Cl.
CPC .............. *B60Q 9/008* (2013.01); *B60P 1/4464* (2013.01); *B60P 1/4485* (2013.01); *B60Q 9/006* (2013.01); *B60Q 9/007* (2013.01)

(58) Field of Classification Search
CPC .... B60P 1/4464; B60P 1/4485; B60P 1/4414; A61G 3/062; A61G 3/06
See application file for complete search history.

(56) References Cited

U.S. PATENT DOCUMENTS

| | | | |
|---|---|---|---|
| 5,149,246 A | 9/1992 | Dorn | |
| 5,674,043 A | 10/1997 | Dorn | |
| 2006/0119473 A1* | 6/2006 | Gunderson et al. | 340/435 |
| 2006/0233632 A1* | 10/2006 | Hayes et al. | 414/546 |
| 2012/0242473 A1* | 9/2012 | Choi | 340/441 |
| 2013/0187792 A1* | 7/2013 | Egly | 340/901 |

* cited by examiner

*Primary Examiner* — Kaitlin Joerger
(74) *Attorney, Agent, or Firm* — Bennett Intellectual Property; Allen F. Bennett (57) ABSTRACT

A wheelchair lift mounted on the rear of an automobile for transporting a wheelchair, scooter or other mobility device includes two or more sets of sensors. A first set of sensors is located at the distal ends of the wheelchair lift platform for use when the platform is horizontal. A 2nd set of sensors is located on the base of the wheelchair lift for use when the platform is folded vertically. The sensors alert a driver to the presence of objects in close proximity to the rear of the vehicle when driven in reverse. They switch automatically activates the base sensors when the platform is folded and the platform sensors when the platform is horizontal.

7 Claims, 6 Drawing Sheets

SYSTEM AND APPARATUS FOR IMPROVED WHEELCHAIR LIFT

CROSS-REFERENCE TO RELATED APPLICATIONS

This application claims priority to U.S. Provisional Application Ser. No. 61/674,011 filed Feb. 20, 2012 the contents of which are hereby incorporated by reference in its entirety.

STATEMENT REGARDING FEDERALLY SPONSORED

Not Applicable

RESEARCH OR DEVELOPMENT

Not Applicable

REFERENCE TO SEQUENCE LISTING, A TABLE, OR A COMPUTER

Not Applicable

PROGRAM LISTING COMPACT DISC APPENDIX

Not Applicable

FIELD

The present invention relates to systems and apparatuses for wheelchair lift devices for attachment to the back of an automobile for transporting wheelchairs and similar devices. More particularly, the invention provide systems and apparatuses for rear mounted wheelchair lifts that include proximity sensors.

BACKGROUND electronically operated hitch mounted wheelchair lifts have been available for a number of years and permit the user of a scooter, wheelchair or other mobility device to be mechanically lifted entered to an automobile or transportation.

A common probably associated with the use of hitch mounted wheelchair lifts is an automobile drivers inability to ascertain how far back the rear wheelchair lift protrudes from the back of the automobile. This results in a large number of accidents where the driver this judges distance and a wheelchair lift impinges upon a solid object causing damage.

It has also become common for automobile manufacturers to include a rear mounted proximity sensor or video camera to assist a driver in driving a car in reverse with out colliding with an object, unseen by the driver. Such proximity sensors and video cameras have become highly desirable features on an automobile. Unfortunately, the attachment of a rear mounted wheelchair lift frustrates the purpose of such devices because a proximity sensor may not take into account the distance between an object behind the car and a wheelchair lift that protrudes from the vehicle itself.

Further frustrating the use of proximity sensors or cameras with a wheelchair lift is the fact that wheelchair lifts typically translate between 2 or more configurations. For example, a wheelchair lift usually incorporates a platform onto which a wheelchair, scooter or other mobility device is rolled on to. Once a wheelchair is rolled onto the platform, it is lifted into the air for transport. However, when a wheelchair is not being transported, it is common for the platform to fold up into a more compact configuration. When I platform is horizontal. It occupies significantly more area than when it is folded up vertically. Any proximity sensor or camera mounted on the rear of an automobile does not take into account either configuration.

In view of the foregoing, there is a need to provide a proximity sensor that may be used in conjunction with a rear-mounted wheelchair lift for an automobile. Furthermore, it is desirable to provide a proximity sensor that may be used in conjunction with a rear-mounted wheelchair lift for an automobile that is effective for all the configurations of the wheelchair lift.

SUMMARY

Accordingly, the primary object of the present invention is to provide a Wheelchair lift that may be mounted on the rear of an automobile and incorporates a proximity sensor or that may accurately indicate to a driver the presence of an distance from any objects behind the automobile and close to the wheelchair lift. The present invention is directed to a hitch mounted wheelchair lift having backup sensors, including both platform sensors and base sensors, for detecting and alerting an automobile operator to an approaching rear obstruction for the purpose of preventing collisions in damage to the lift platform, a scooter or wheelchair carried on the platform, as well as the obstruction.

The wheelchair lift may have components that wirelessly communicate, or that are connected by wiring. When wiring is used, quick disconnect devices for connecting and disconnecting the associated wiring may be used for easy attachment and detachment as well as for safety reasons.

The backup sensors communicate with a visual display and/or speakers or audio devices that may alert the driver, and communicate to him or her the presence of an proximity to obstructions or solid object to the rear of an automobile and wheelchair lift.

Visual displays are increasingly common for rear placement on an automobile. They driver places the transmission in reverse, a camera provides a video feed to a display for the driver. In addition, it is also common for proximity sensors to initiate a beeping sound when an object is detected to the rear of an automobile. Often, a repeated beeping is emitted from a speaker, and the frequency of the beeps increases as the distance to an object decreases.

In the present invention, similar devices are used and are incorporated into a wheelchair lift. 2types of sensors are utilized: a first sensor or sensors may be placed on a distal ends of the wheelchair platform; a second sensor or sensors may be placed on the distal end of the base of the wheelchair lift. When the platform is horizontal, the sensors at the distal end of the platform are used to detect obstructions to the rear of the automobile. When the platform is folded into the horizontal position. The sensors on the base of the wheelchair lift are used for proximity detection. Switching may occur automatically between the 2 types of sensors. Audio and visual devices may be used to communicate to a driver the presence of an proximity to any obstructions or solid object to the rear of the vehicle.

It is therefore an object of the present invention to provide a wheelchair lift having sensors for detecting the presence of and distance to objects to the rear of an automobile and wheelchair lift accurately when the lift platform is in either the horizontal or the vertical position.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Figure 1:
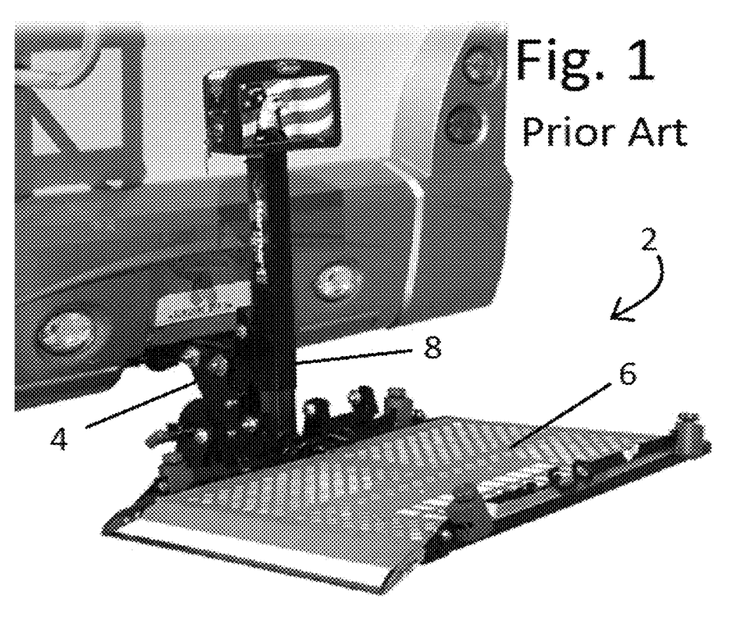
FIG. 1 is a perspective view of a wheelchair lift with a platform in the horizontal position of the prior art.

FIG. 1 shows a wheelchair lift 2 of the prior art. The wheelchair lift to includes a hitch mount 4 for removable attachment to the trailer hitch receiver on an automobile. The hitch mount 4 may be designed for compatibility with any particular trailer hitch receiver back considerably support the lift platform 2. The hitch mount 4.

Figure 2:
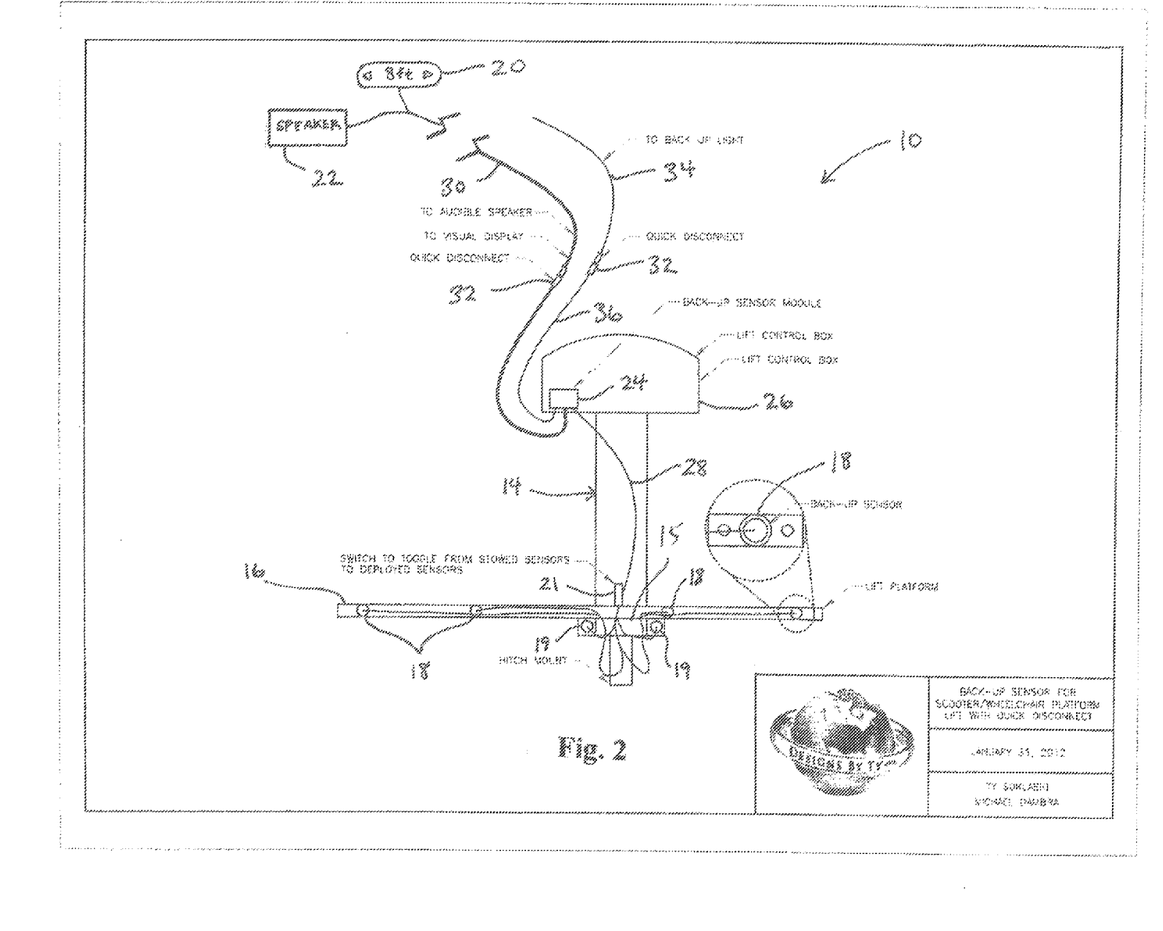
FIG. 2 is a rear view of a wheelchair lift with a platform in the horizontal position in accordance with the principles of the invention.
Figure 3:
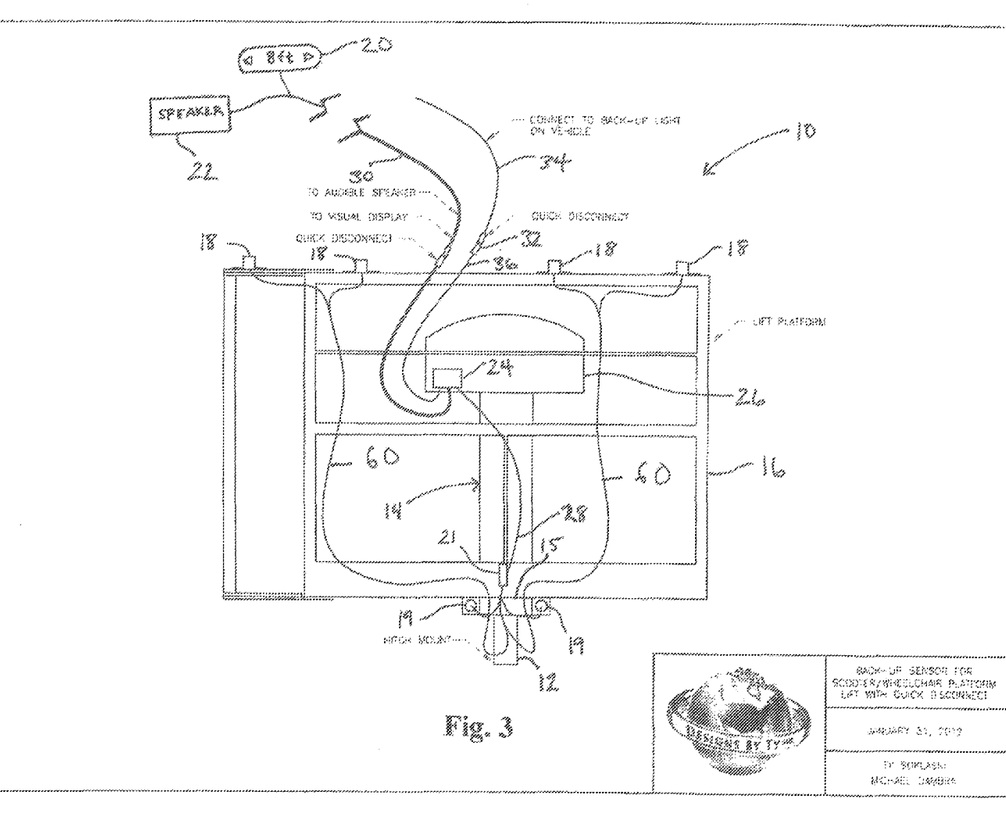
FIG. 3 is a rear view of a wheelchair lift with the platform in the vertical position in accordance with the principles of the invention.
Figure 4:
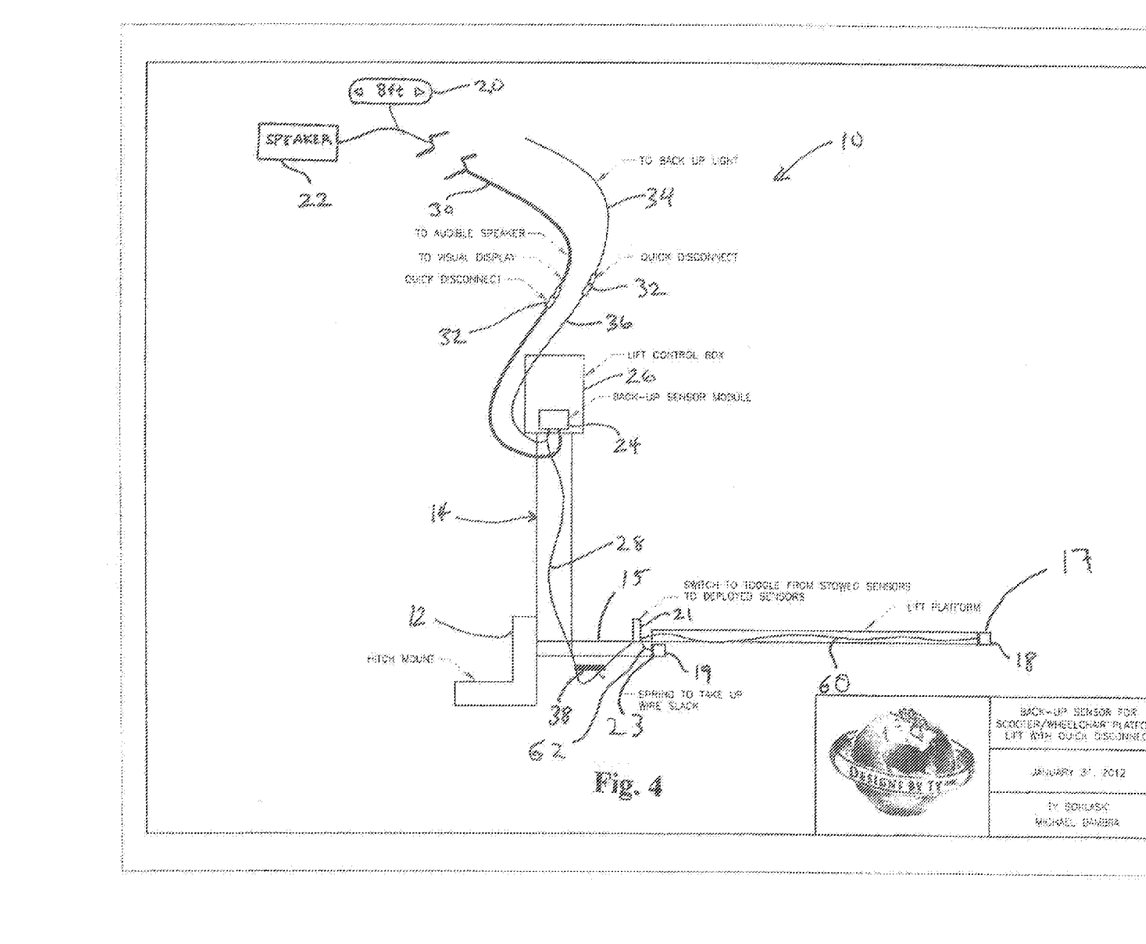
FIG. 4 is a side view of a wheelchair lift with the platform and the horizontal position in accordance with the principles of the invention.
Figure 5:
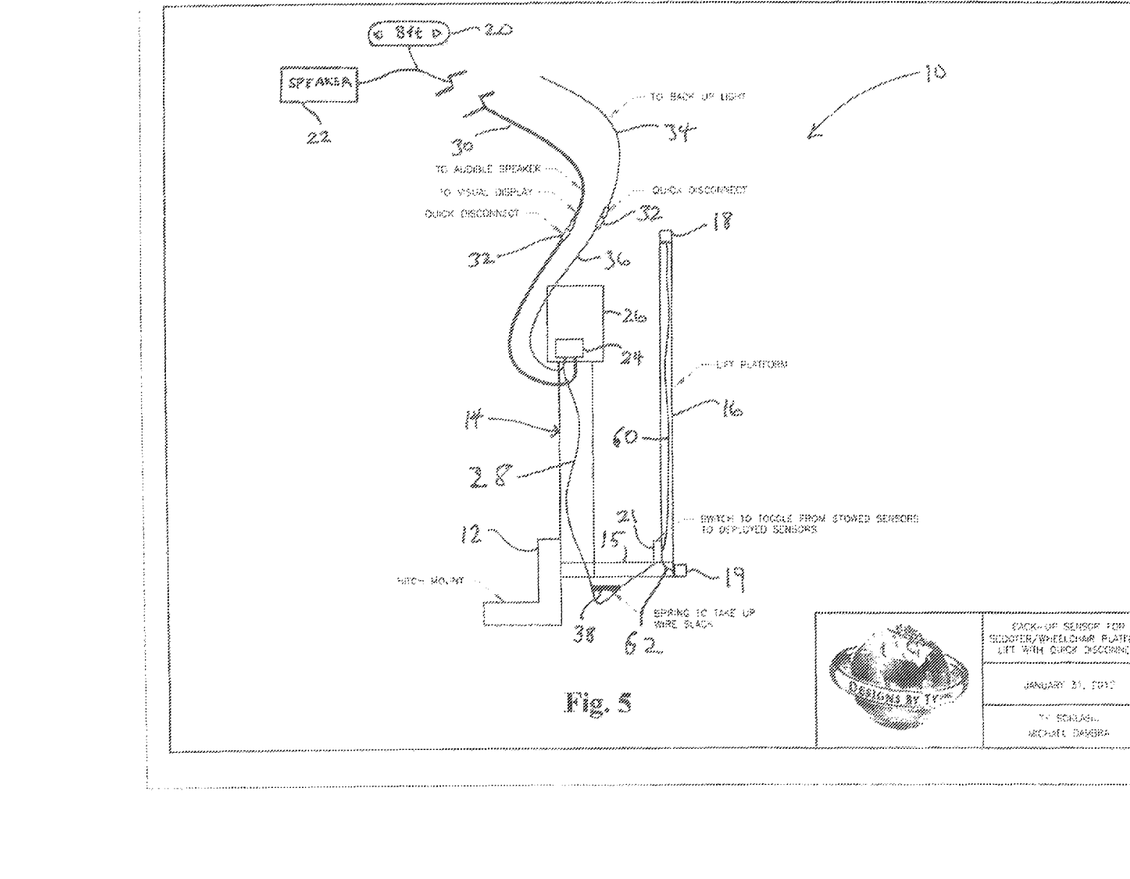
FIG. 5 is a side view of a wheelchair lift with the platform in the vertical position in accordance with the principles of the invention.

Referring to FIGS. 2-5, the wheelchair lift 10 may include a hitch mount 12 for removable attachment to a trailer hitch receiver on an automobile. The hitch mount 12 may be designed for compatibility with any particular trailer hitch receiver that may suitably support wheelchair lift 10. The hitch mount 12 may be in secured and/or adjustable connection with elevator 14. Base 15 may be located at the bottom of elevator 14. The distance of base 15 from the ground may be increased and decreased by mechanical operation of the elevator 14, which uses telescoping or other means to translate the height of the base from flush with the ground to an elevated position during transport. Base 15 may be pivotally connected to platform 16. Platform 16 may be pivoted through about 90° from a horizontal position perpendicular to the elevator 14 as shown in FIGS. 2 and 4 to a vertical position as shown in FIGS. 3 and 5 parallel to the elevator 14. Mechanical operation of elevator 14 may allow the base 15 and platform 16 to be lowered such that the platform 16 is flush with the ground.

The wheelchair lift 10 may include one or more platform sensors 18 located at the distal end 17 of the platform 16. Platform sensors 18 may be secured to the platform 16 using any sufficient securing means known in the art, including, but not limited to, bolts, adhesives, screws, brackets, tape or the like. Platform sensors 18 may be infrared sensors, lidar sensors, capacitance sensors, sonar sensors or other sensors capable of determining when a solid object is within a proscribed distance from the distal end 17 of the platform 16. Optionally, platform sensors 18 may be cameras or video devices or sensors. The platform sensors 18 may be directed away from the base 15 and the elevator 14 such that they are directed rearward and away from an automobile to which the hitch mount 12 is attached. In the embodiment shown in FIGS. 1-4, four platform sensors 18 are affixed to the distal end 17 of the platform 16. Optionally, a wheelchair lift in accordance with the principles of the invention may have as few as one platform sensor 18 or five or more platform sensors 18.

Base sensors 19 may secured to the distal end 23 of the base 15. Platform sensors 19 may be secured to the base 15 using any sufficient securing means known in the art, including, but not limited to, bolts, adhesives, screws, brackets, tape or the like. Base sensors 19 may be infrared sensors, lidar sensors, capacitance sensors, sonar sensors or other sensors capable of determining when a solid object is within a proscribed distance from the distal end 23 of the base 15. Optionally, Base sensors 19 may be cameras or video devices or sensors. The base sensors 19 may be directed away from the elevator 14 such that they are directed rearward and away from an automobile to which the hitch mount 12 is attached. In the embodiment shown in FIGS. 2-5, two base sensors 19 are affixed to the distal end 23 of the base 15. Optionally, a wheelchair lift in accordance with the principles of the invention may have as few as one base sensors 19 or three or more base sensors 19.

When the platform 16 is perpendicular to the elevator 14 and parallel to the ground, platform sensors 18 may detect when a solid object comes within the prescribed distance. When the platform 16 is parallel to the elevator 14 and perpendicular to the ground, platform sensors 18 may be directed upward and base sensors 19 may detect when a solid object comes within the proscribed distance.

The wheelchair lift 10 may include a switch 21 that controls the platform sensors 18 and the base sensors 19. Switch 21 made attacks when platform 16 is in the horizontal position and activate platform sensors 18, while simultaneously deactivating base sensors 19. When platform 16 is folded into the horizontal position parallel to the elevator 14, the switch 21 may deactivate sensors 18 and activate sensors 19. In this manner, the appropriate sensors are automatically selected for use in detecting the proximity of solid objects behind an automobile.

A wheelchair lift in accordance with the principles of the invention may also include a visual display 28 and/or a speaker 22. Optionally, only one of a display 28 and a speaker 22 may be provided. When any of the sensors 18 and 19 detect a solid object within the proscribed distance a signal may be sent to the visual display 28 and/or a speaker 22. A speaker 22 may provide a chime or be to alert a driver that the rear of the vehicle is approaching a solid object. Optionally, the speaker 22 may provide a repeating series of sounds which may increase or decrease depending upon the proximity of objects behind an automobile and detected by the sensors. Optionally, speaker 22 may provide a voice stating the distance of any object behind the automobile as detected by the sensors 18 and 19.

A visual display 20 may similarly provide information to the driver of an automobile to which the wheelchair lift is attached by displaying alphanumeric information, for example, the visual display 20 may display the distance of an object from the sensors 18 or 19 and feet, meters, or the like. Where the sensors 18 and 19 comprise a video camera or video sensor, the visual display 20 may be a video screen displaying the image procured by the video camera or video sensor. Those skilled in the art will appreciate that sensors 18 and 19 are very similar to the sensors that are quickly becoming common on the rear of automobiles to prevent accidental collisions.

Platform sensors 18, base sensors 19, switch 21, visual display 20 and speaker 22 may be an electronic signal communication with one another in any of a variety of series or patterns using various methodologies known in the art. In the embodiment shown in FIGS. 2-5, the various components are connected by means of wiring. However, it may be desirable for one or more of the components to be an wireless communication. Wireless communication may be preferable to minimize the possibility of entanglement of wiring and may obviate the need for quick release devices Incorporated into the wiring as is commonly done with vehicles today.

In the embodiment shown in FIGS. 2-5, platform sensors 18 are in electronic signal communication with switch 21 by means of wires 60. Similarly, base sensors 19 are in electronic signal communication with switch 21 by means of wires 62. Switch 21 may be an electronic signal communication with a sensor module 24 by means of wires 28. Sensor module 24 may relay any electronic signals from the sensors 18 or 19 to a visual display 20 and or a speaker 22 via switch 21.

The wheelchair lift 10 includes moving parts. As a result, the distances from the various components may vary as the platform 16, base 15 and elevator 14. All moved in relation to one another. As a result, access slack may develop in one or more of the wires. It may therefore be desirable to include one or more Springs 38 to collect slack in one or more wires to prevent tangling or other damage. Optionally, it may be desirable to use sensors, switches, module and other components that may communicate wirelessly. This may result in a wheelchair lift being more durable and less easily damaged.

Sensor module 24 may be in wireless communication with a visual display 20 and or a speaker 22 and, as in this embodiments, may be Incorporated into the lift control box 26, which may house various components of the elevator 14. In this embodiment, however, sensor module 24 is an electronic signal communication by means of wire 30 which includes a quick disconnect 32, as is commonly used in trailers attached to automobiles. Similarly, in the wheelchair lift 10 shown in the figures, power is supplied to the various components by power cord 34, which may draw power from the backup or reverse light and supply it to power cord 36 to which it is connected by means of quick release 32. Sensor module 24 may then distribute power to switch 21 and sensors 18 and 19. Will when components capable of communicating wirelessly are utilized, the various components may have individual power sources, such as for example a battery. Optionally, wirelessly communicating components may draw power from power cords.

Switch 21 may operate by any of a variety of means known in the art. Switch 21 operates such that electronic signals may be received from base sensors 19. When platform 16 is in the horizontal position perpendicular to the ground. Switch 21 also may operate such that no signal is received from base sensors 19 when platform 16 is in the horizontal position parallel to the ground. When the platform 16 is a horizontal position switch 21 may operate to only receive signals from platform sensors 18. Magnetic switches, liquid mercury switches or even very simple mechanical switches they all be utilized by switch 21 to activate and deactivate sensors 18 and 19 depending upon the position of the platform 16.

Visual display 20 and speakers 22 may be an wireless or wired electronic signal communication with the sensor module and/or the switch 21 and/or the sensors 18 to 19. Optionally, sensor module 24 may be integrated with visual display 20 and/or speaker 22. Optionally, a single component may be utilized and placed in close proximity to the operator or driver of the vehicle, the single component, including visual displays and/or audio displays as well as any circuitry required. The components proximal to the operator of the vehicle may have their own power supply or may be supplied power from the automobile, such as through the cigarette lighter.

Figure 6:
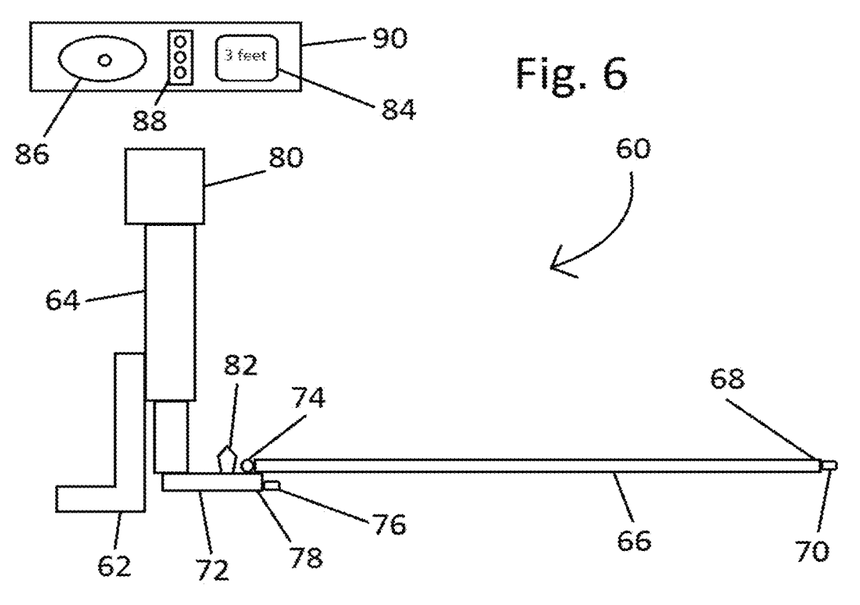
FIG. 6 is a side view of an alternative embodiment of a wheelchair lift with a platform in the horizontal position in accordance with the principles of the invention.

FIG. 6 shows an alternative embodiment of a wheelchair lift 60. In this embodiment, hitch 62 may be secured to elevator 64. At the upper end of elevator 64 is control box 80 that may house various components of the elevator 64, may provide a mount for a license plate or other indicia and may incorporate other items. At the lower end of elevator 64 is base 72. Platform 66 is pivotally attached to the base 72 at pivot hinge 74. Platform 66 in FIG. 6 is in the horizontal position. Pivot hinge 74 allows platform 66 to transition to a vertical position substantially flush with elevator 64 and perpendicular to the ground.

At the distal end 68 of platform 66 is a sensor 70. In this embodiment, the sensor 70 comprises a video camera that may also be capable of determining distance. At the proximal end 78 of base 72 may be located sensor 76. Like sensor 70, sensor 76 comprises a video camera that may also be capable of determining. Switch 82 proximal to base 78 and platform 66 detects whether the platform is in the horizontal or vertical position and activate and deactivate sensors 70 and 76 accordingly. Switch 82 is an wireless electronic communication with both since or 70 and since or 76.

Sensors 70 and 76 and/or switch 82 may be an wireless communication with information module 90. Information module 90 includes a visual display 84 that may display a video signal from the camera allowing the operator of an automobile to "see" what the sensor 70 or 76 sees. Optionally, video display 84 may display an alphanumeric indicator of the distance from the sensor to a solid object. Information module 90 may also include an audio output 86 that may be used to signal the presence of a solid object in close proximity to the sensors 70 or 76. Information module 90 may also include a control panel 88, which may allow the operator to select between various forms of audio and visual signals. Because the components are wireless, there is no need for wiring that may become tangled or damaged.

Whereas, the present invention has been described in relation to the drawings attached hereto, it should be understood that other and further modifications, apart from those shown or suggested herein, may be made within the spirit and scope of this invention. Descriptions of the embodiments shown in the drawings should not be construed as limiting or defining the ordinary and plain meanings of the terms of the claims unless such is explicitly indicated.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A wheelchair lift comprising:
   a hitch mount;
   an elevator connected to the hitch mount;
   a base at the bottom of the elevator;
   a platform pivotally attached to the base and capable of translating between a horizontal and a vertical position;
   one or more platform sensors located on a distal end of the platform and directed rearward and away from an automobile to which the hitch mount is attached when the platform in in the horizontal position and directed upward when the platform is in the vertical position;
   one or more base sensors located on a distal end of the base and directed rearward and away from the automobile;
   a visual display or a speaker; and
   a switch.

2. The wheelchair lift of claim 1:
   wherein the one or more base sensors determine when a solid object is within a proscribed distance from the distal end of the base; and,
   wherein the one or more platform sensors detect when a solid object is within a proscribed distance from the distal end of the platform.

3. The wheelchair lift of claim 2 wherein the one or more platform sensors are cameras and the one or more base sensors are cameras.

4. The wheelchair lift of claim 2 wherein the one or more platform sensors are infrared sensors and the one or more base sensors are infrared sensors.

5. The wheelchair lift of claim 2:
   wherein the switch activates the one or more platform sensors and deactivates the one or more base sensors when the platform is in the horizontal position; and
   wherein the switch deactivates the one or more platform sensors and activates the one or more base sensors when the platform is in the vertical position.

6. The wheelchair lift of claim 5 wherein the one or more platform sensors are cameras and the one or more base sensors are cameras.

7. The wheelchair lift of claim 5 wherein the one or more platform sensors are infrared sensors and the one or more base sensors are infrared sensors.

* * * * *